Aug. 31, 1954 E. FLETCHER 2,687,599
APPARATUS FOR MELTING GLASS
Filed Nov. 17, 1950 4 Sheets-Sheet 1
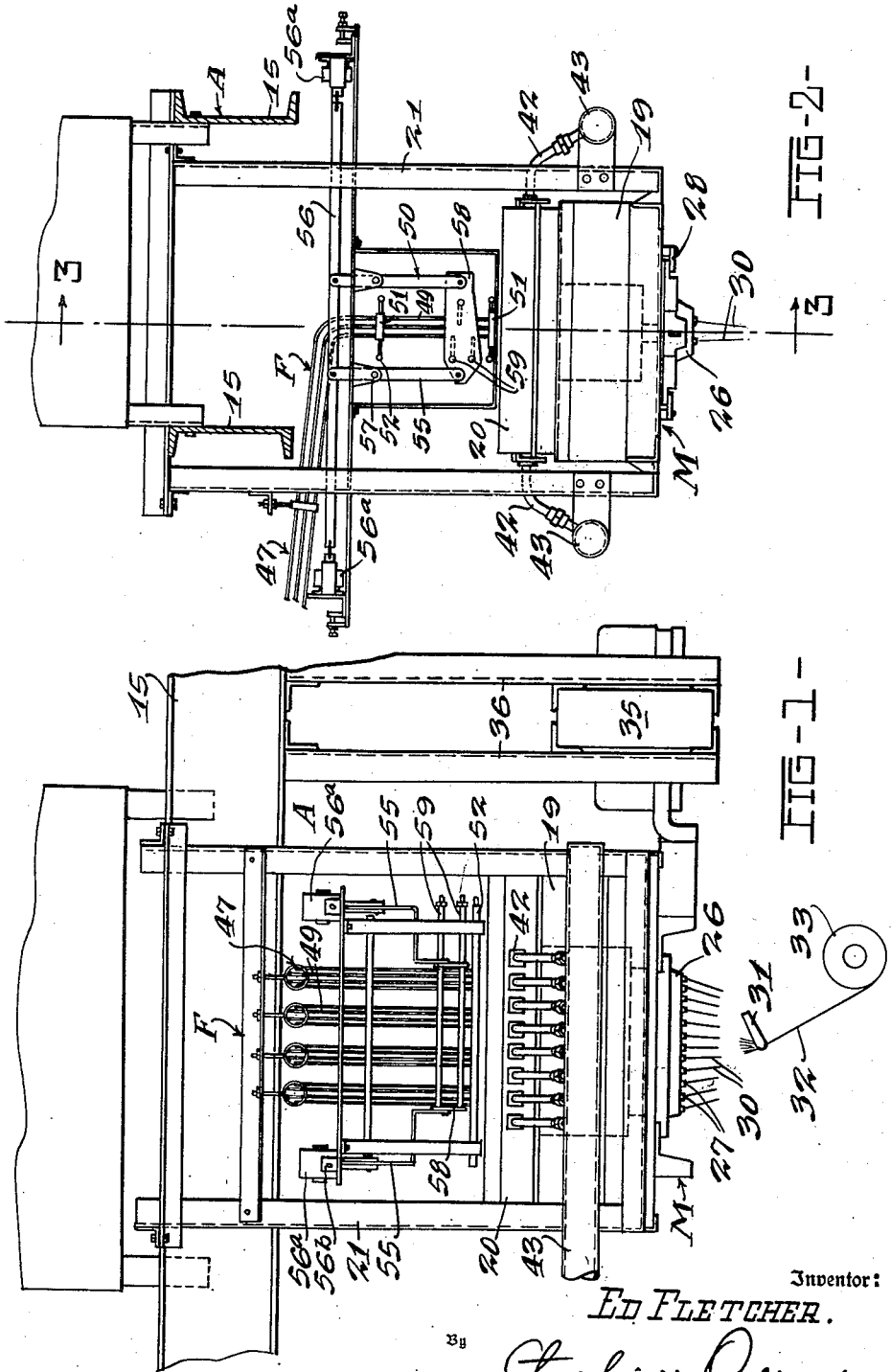
Inventor:
ED FLETCHER.
By
Attorneys

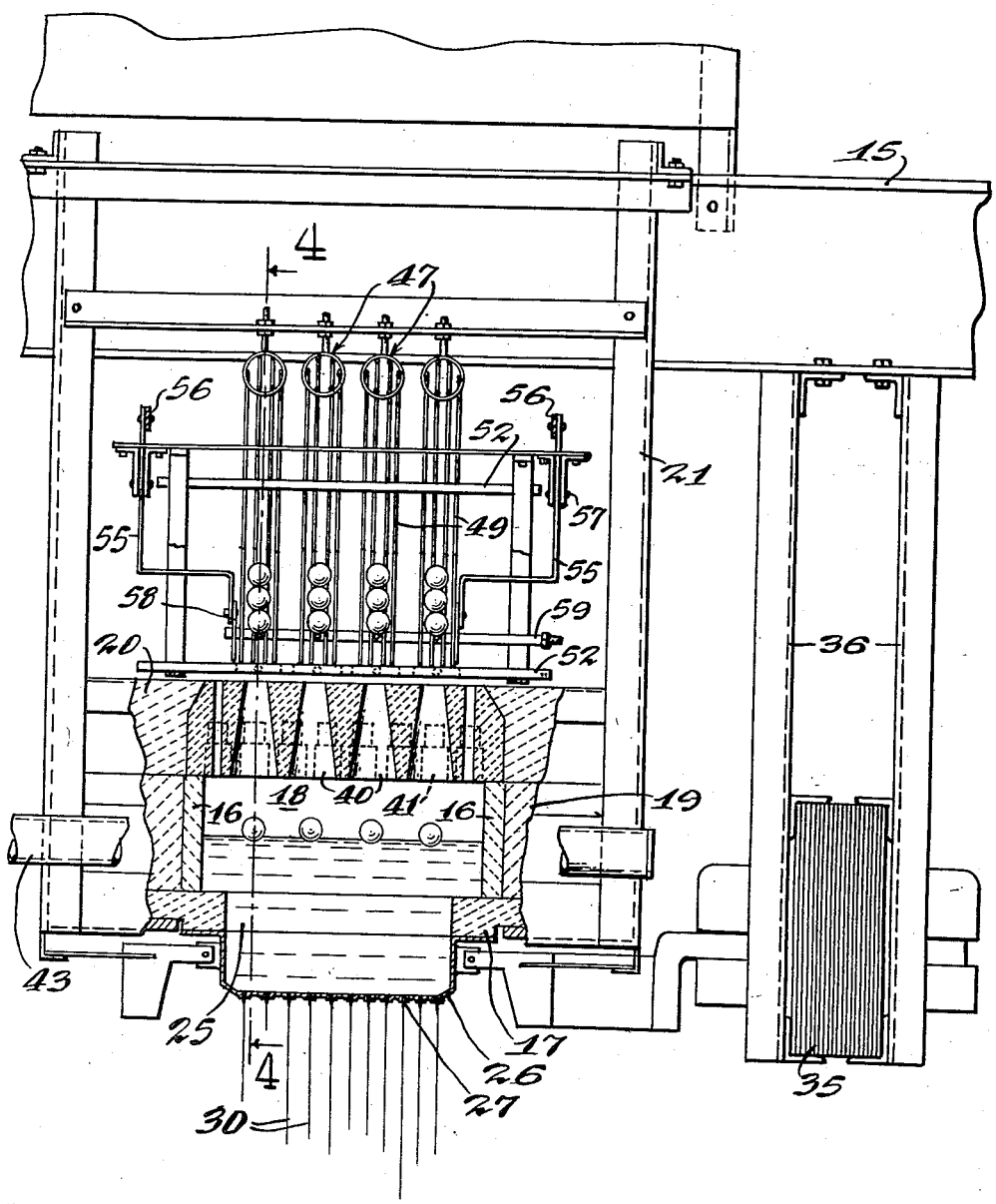
FIG-3-

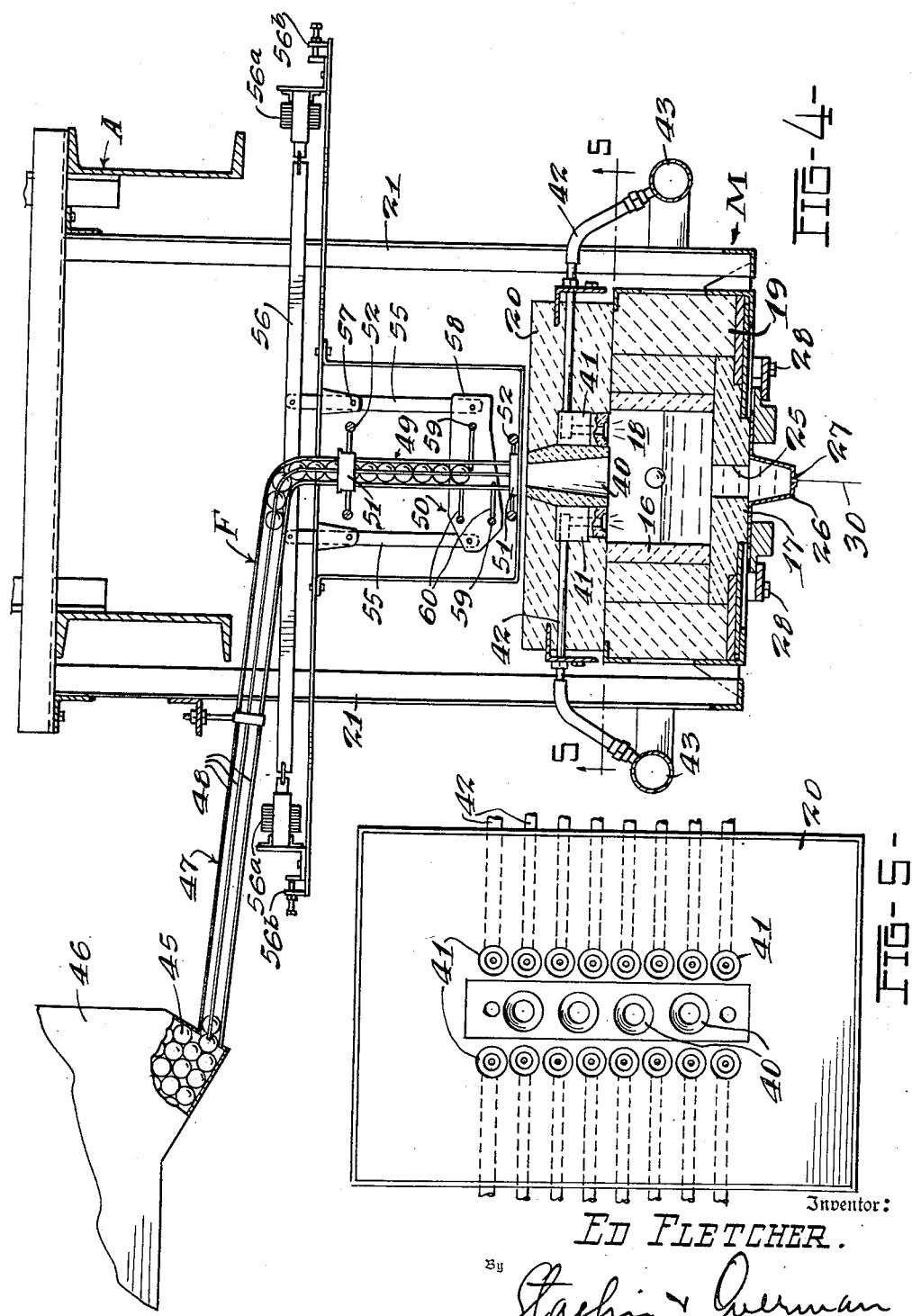

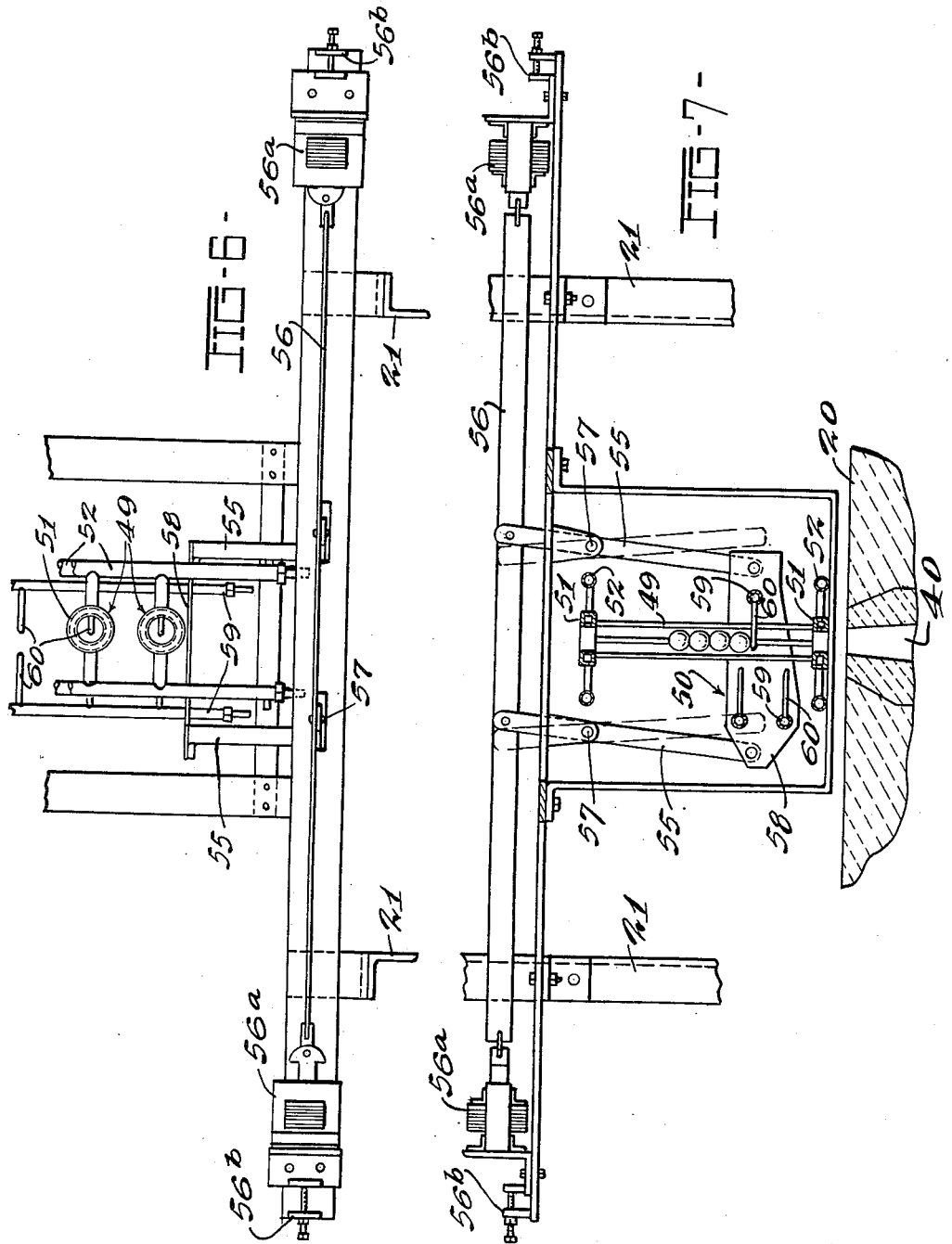

Patented Aug. 31, 1954

2,687,599

UNITED STATES PATENT OFFICE 2,687,599

APPARATUS FOR MELTING GLASS

Ed Fletcher, Newark, Ohio, assignor to Owens-Corning Fiberglas Corporation, a corporation of Delaware Application November 17, 1950, Serial No. 196,160

7 Claims. (Cl. 49—54)

The present invention relates to melting glass to be formed into fibers and more particularly to an improved means for melting glass marbles or cullet.

The present invention has for one of its principal objects to continuously and rapidly produce molten glass in a relatively small volume and finds particular utility in the manufacture of glass fibers of the continuous type.

In the production of glass fibers of the continuous type such as are employed in the manufacture of textile fabrics, and the like, glass batch or cullet is introduced into a feeder heated electrically or otherwise to a temperature sufficiently high to melt the glass and having orifices at the bottom through which the molten glass flows by gravity in the form of streams. The streams are attenuated to fine fibers which may be collected into a strand and wound on a suitable collecting drum. The collecting drum is rotated at a substantially constant rate in order to attenuate the fibers at a more or less uniform linear speed. Thus, under normal operating conditions the amount of glass drawn per hour from the feeder in the form of fibers is constantly replaced with unmelted materials by periodically adding small amounts at a time to the feeder.

Generally, the foregoing is substantially correct. However, proper operation of the feeder is dependent on several factors which include temperature and viscosity of the glass, glass level in the feeder, and atmospheric conditions in the region of the attenuating zone. The production of glass fibers of high quality requires a glass which is substantially free of impurities, stones, and the like, since such bodies in the glass tend to obstruct the small streams at the orifices and cause stoppage of the operation. For this reason the feeders are usually constructed substantially entirely of heat resistant metal which, in order to withstand the corrosive action of molten glass and the high temperature, is usually a precious metal alloy such as a platinum alloy. This not only involves a high initial cost but such containers must be periodically replaced.

It is an object of the present invention to provide a melter for molten glass in which the usual amount of precious metal is substantially reduced.

The small size of the usual textile or continuous glass fiber operation is another reason metallic containers are employed. In the customary large scale glass melting operation refractory materials may be suitably employed as a lining since the furnace is provided with a melting and refining section and stones and the like have an opportunity to settle out before the glass is discharged. Raw batch materials are normally employed in large installations because sufficient time is available for properly melting and refining the glass.

However, in fiber forming operations of the present type, the container for the glass is small, holding about five to ten pounds of glass, and it is thus important that the raw materials be converted rapidly into glass. Calcined batch or glass cullet in the form of marbles are normally employed in small feeders of the present type because the materials readily convert directly to molten glass and do not require the usual refining time necessary with raw batch materials.

Glass marbles are preferably employed in the present invention because they are readily and easily handled for introduction into the melter. The marbles are produced from a homogeneous glass composition in a molten state by suitable marble forming apparatus after which they are cooled more or less rapidly. The marbles are substantially uniform in size, weight, and composition. As the marbles are fed into the feeder they soften and become molten in a relatively short space of time and combine to again provide a homogeneous mixture of molten glass from which fibers are drawn. The uniform size and shape of the marbles permits easily controlling the feed thereof.

It is another object of the present invention to provide a means for automatically feeding marbles into a melter at a controlled predetermined rate, said rate being substantially equal to the rate of flow of the molten glass from the melter.

Still another object of the invention is to provide a refractory lined glass melting furnace of small size adapted to continuously and rapidly produce molten glass of high quality.

When feeders are constructed substantially entirely of metal they are usually heated by electrical means which includes connecting the container in a suitable heating circuit. The walls of the container thus serve as a heating element. In the present invention where substantially all the metal except for an orifice plate is eliminated, it is proposed to employ gaseous fuel to supply the melting heat and electricity is used to control the temperature at the discharge orifices.

It is a further object of the present invention to employ a combination of gaseous fuel and electric heating in the production of glass to be formed into fibers.

One difficulty encountered in the use of preformed marbles as a source of supply for the glass results from the fact that as the marbles are formed and cooled, strains are sometimes set up therein. When these cold marbles are fed directly into a hot melting chamber, the sudden application of heat sometimes causes the marbles to explode with sufficient force that previously melted glass is splashed over the walls of the chamber and coats the exposed burner parts. This not only destroys the heating efficiency of the burners but particles of the cold marbles chip bits of refractory from the walls which contaminate the glass and destroy the quality in addition to interrupting the fiber forming operation.

It is a still further object of the invention to preheat the marbles to substantially increase their temperature before they are introduced into the melting chamber.

Other objects and advantages of the present invention will become apparent during the course of the following description when considered in the light of the accompanying drawings, in which:

Figure 1 is a side elevational view of an apparatus embodied in the present invention;

Figure 2 is an end elevational view of the apparatus shown in Figure 1;

Figure 3 is a vertical sectional view with parts being shown in elevation and taken substantially along line 3—3 of Figure 2;

Figure 4 is a vertical transverse sectional view taken substantially along line 4—4 of Figure 3;

Figure 5 is a bottom plan view of the cover wall illustrating the burner arrangement employed in the present invention;

Figure 6 is a partial plan view of the marble feeding mechanism embodied in the present invention; and Figure 7 is a side elevational view of the apparatus shown in Figure 6.

Referring now to the drawings, particularly Figures 1 and 2, the apparatus comprises generally a melting unit M and batch material feeding mechanism F supported by structural framework A. The melting unit and associated feeder mechanism are preferably supported by overhead structural iron work such as girders 15 thereby permitting a clear and unobstructed floor space beneath the feeder mechanism.

The melter unit M (Figures 3 and 4) comprises a container for molten glass formed substantially entirely of refractory materials including side and end walls 16 of ceramic material inert to the action of heat and molten glass and a bottom wall 17 formed of similar material and defining a melting chamber 18. The walls forming the melting chamber 18 are enclosed by insulating material such as heat insulating refractory blocks 19. The melting chamber 18 is provided with a cover block 20 of refractory material which will be described in greater detail presently. The melter unit assembly is carried on angle iron supports 21 attached to the girders 15.

The melting chamber 18 is preferably rectangular in cross section and the bottom wall 17 thereof is provided with a longitudinal slot 25 through which the molten material is delivered to a bushing 26 or flow plate containing orifices 27 through which the molten material flows in the form of streams to be attenuated to fibers. The bushing 26 is secured against the bottom wall 17 by a suitable attaching means 28 to enable replacement of the bushing or flow plate whenever such becomes necessary. The bushing 26 may be formed of any suitable metallic alloy such as a platinum alloy or a metal which may be a nonprecious metal such as, for instance, molybdenum.

Figure 1 of the drawings illustrates one form of apparatus with which the present invention may be employed for the production of strands of glass fibers. Streams of molten glass 30 flowing from the orifices 27 in the feeder 26 are gathered together in a bundle at a guide 31 to produce a strand 32 which may be wound on a drum 33 or otherwise attenuated as by a conventional cap winder well known in the textile art. A suitable lubricant or binder may be applied to the fibers at the guide 31 to provide integrity in the strands.

In order to maintain uniform temperature in the glass within the bushing 26, the bushing is connected in series with a transformer 35 forming a part of a suitable heating circuit. The transformer is supported on angle irons 36 supported from the girders 15 previously mentioned. The control of the temperature of the glass within the bushing is thus independent of the temperature within the melting chamber 18.

Referring particularly to Figures 3, 4 and 5 of the drawings, the cover block 20 is provided with a series of vertically extending openings 40 through which the glass cullet is introduced into the melting chamber 18 and through which the gases resulting from the melting of the cullet escape. A plurality of radiant type burners 41 are arranged in rows paralleling the row of openings 40 and at either side thereof and are adapted to direct the heat therefrom directly onto the surface of the molten material within the melting chamber. The burners are of incandescent inverted cup type and adapted to operate on a suitable gaseous fuel which may be either a mixture of fuel gas and air or liquid fuel such as oil or the like fed at a relatively low pressure. Because of the small size of the melting chamber 18, the burners generate within the chamber a temperature which may well be in the range of 2500° F. to 2600° F., this temperature being sufficient to rapidly melt the glass cullet and reduce it to a molten state. Fuel is supplied to the burners 41 through pipes 42 extending outwardly through the cover block 20 and connecting respectively on opposite sides of the melter unit with supply manifolds 43 connected with a suitable source of fuel. Thermocouples (not shown herein) may be employed to maintain a substantially uniform melting temperature within the chamber 18 and regulate the amount of fuel fed to the burners.

The batch materials herein shown as glass stock is fed into the top of the feeder and are preferably in the form of glass marbles 45. The marbles are supplied from a hopper 46 and are discharged by gravity from the bottom of the hopper into the upper end of a chute 47. In the present instance the chute 47 is formed by four or more bars 48 spaced from each other around the circumference of a circle somewhat greater in diameter than the diameter of the marbles 45 and arranged to retain the marbles in the chute. The delivery end 49 of the chute extends vertically downward in the direction of the cover block 20 and in alignment with the openings 40 therein. Thus a column of marbles is provided over each opening. The marbles 45 flowing along the chute 47 are prevented from entering directly into the melting chamber by gate mechanism 50 to be described presently.

During operation of the melter, the vertical portion of the delivery end 49 of the chute is constantly subjected to intense heat thereby necessitating the provision of cooling means to prevent the marbles from sticking to the chute. This is accomplished by replacing the bars 48 with tubing which is supported at either end in cored-out collars 51 suitably connected through pipes 52 with a source of cooling fluid. Thus a suitable cooling medium such as water may be continually circulated through the pipes 52, collars 51 and the vertical tubular members comprising the delivery end 49 of the chute. The column of marbles 45 thus retained within the chute 49 by the gate mechanism 50 are subjected to continued heating, thus raising their temperature before they are permitted to enter the melting chamber.

The gate mechanism 50 forming a part of the feeder assembly F is illustrated in Figures 6 and 7 of the drawings. The assembly is preferably supported on the angle iron framework 21 and comprises pairs of depending pivoted levers 55 which are connected at their upper ends by a bar 56 horizontally disposed with relation to the arms 55. The bar 56 is adapted for reciprocating motion by solenoids 56a connected to each end thereof and adjustably mounted as indicated at 56b. The levers 55 are pivoted medially of their length as indicated at 57 to a portion of the supporting framework and are connected at their lower ends to a plate 58. The plate 58 is adapted to support opposite ends of hollow bars 59 parallelly arranged on either side of the chute 49. The bars 59 are provided with inwardly projecting pins 60 which extend at times into the marble chute and prevent the falling out of the marbles therein. The pins 60 on one side of the chute are disposed in vertically arranged pairs cooperating with a single pin supported on the opposite side of the chute. Thus when the bar 56 is reciprocated by the solenoids 56a the levers 55 are caused to swing back and forth thus alternately introducing the pair of pins or the single pin into the chute in the path of the marbles. This action permits releasing a single marble at a time into the feeder.

In order to prevent overheating of the pins 60 by the gases being discharged through the openings 40, air under low pressure is supplied to the bars 59 from a suitable source and discharged through the points of the pins 60 so that the temperature is thus maintained substantially lower than that of the marbles. The marbles being supported in the chute 49 are thus heated gradually to a high temperature so that heat is conserved. This pre-heating of the marbles also tends to decrease the possibility of marbles exploding within the melting chamber due to sudden temperature changes. Each chute 49 is provided with an individual set of pins 60 and, as indicated in the drawings, four chutes are illustrated. However, operation of the solenoids 56a which may be by any suitable timing mechanism causes simultaneous operation of the pins relative to each chute so that a marble is discharged into each opening 40 upon operation of the solenoids. This permits uniformly feeding uniformly sized bodies of glass into the melting chamber so that the level of molten glass may be maintained within the melting chamber as the streams flow from the orifices 27.

The number of marbles fed to the melter per unit of time may be regulated according to the volume of flow of glass from the melter. This may at times require the use of only one or two feeders being operated at a slow interval or it may require the use of all four feeders operating at a greatly accelerated rate. A melter of the present small size may well be capable of producing fifteen pounds or more of molten glass per hour and this is accomplished because of the rapid rate at which the preheated marbles are reduced to a molten state. Since the temperature of the glass being discharged from the bushing may be controlled independently of that within the melter chamber, the melting temperature within the chamber can be substantially higher to assure rapid melting of the marbles.

Modifications may be resorted to within the spirit of the invention and the scope of the appended claims.

I claim:

1. Apparatus for melting glass and drawing fibers therefrom comprising a melting chamber having a plurality of upper wall openings and a plurality of apertures in its lower wall, said apertures being much smaller in diameter than said upper wall openings, water-cooled chutes disposed over said upper wall openings and associated therewith means spaced from said upper wall openings for supporting a vertical column of particulate glass within said water-cooled chutes and for controlling the admission of preheated particulate glass into said chamber, means for heating said chamber including gaseous fuel burners directed into said chamber, and means for exhausting the combustion products of said burners, said means comprising said upper wall openings.

2. Apparatus for melting glass and forming fibers therefrom comprising a refractory lined chamber, means for heating said chamber including radiant type gaseous fuel burners directed therein, said chamber having a plurality of upper wall openings for exhausting the products of combustion therefrom, water-cooled chutes disposed over said upper wall openings and associated therewith means spaced from said upper wall openings for supporting a vertical column of particulate glass within said water-cooled chutes and for controlling the admission of preheated particulate glass into said chamber, and apertures at the lower wall of said chamber for forming very fine streams of molten glass.

3. Apparatus for melting glass comprising a refractory lined melting chamber adapted for receiving glass marbles, means for heating said chamber including radiant type gaseous fuel burners arranged in two parallel rows in the upper wall of said chamber, and connected to a common fuel manifold a row of upper wall openings arranged between the parallel rows of said burners adapted for admitting glass marbles and exhausting the products of combustion of said burners, and water-cooled chutes disposed over said upper wall openings and associated therewith means spaced from said upper wall openings for supporting a vertical column of particulate glass within said water-cooled chutes and for controlling the admission of preheated particulate glass into said chamber.

4. Apparatus for melting glass and forming fibers therefrom comprising a refractory lined melting chamber, said chamber being provided with two parallel rows of radiant type gaseous fuel burners directed into said chamber through an upper wall thereof and between said rows of burners a row of openings for exhausting burner combustion products and admitting particulate glass, water-cooled chutes disposed over said upper wall openings and associated therewith means spaced from said upper wall openings for supporting a vertical column of particulate glass within said water-cooled chutes and for controlling the admission of preheated particulate glass into said chamber, and means for forming fine stream of molten glass from said chamber.

5. Apparatus for melting glass and drawing fibers therefrom comprising a refractory-lined melting chamber, a metallic bushing associated with said chamber and having openings through which the molten glass flows in fine, attenuable streams, heating means for said chamber comprising a plurality of gaseous fuel burners directed into said chamber, heating means for said bushing comprising an electrical circuit in which said bushing is a resistant element, openings in an upper wall of said chamber for admission of particulate glass and exhaustion of gaseous fuel combustion products, and water-cooled chutes disposed over said upper wall openings and associated therewith means spaced from said upper wall openings for supporting a vertical column of particulate glass within said water-cooled chutes and for controlling the admission of preheated particulate glass into said chamber.

6. Apparatus for melting glass marbles and forming fibers therefrom comprising a refractory-lined melting chamber, a metallic bushing associated with said chamber and having openings through which the molten glass flows in fine, attenuable streams, heating means for said bushing comprising an electrical circuit in which said bushing is a resistance element, heating means for melting glass in said chamber comprising a double row of radiant type gaseous fuel burners directed through an upper wall of said chamber, a plurality of upper wall openings arranged in a row between said double row of burners for exhausting products of combustion of said burners and admitting glass marbles into said chamber, and water-cooled chutes disposed over said upper wall openings and associated therewith means spaced from said upper wall openings for supporting a vertical column of particulate glass within said water-cooled chutes and for controlling the admission of preheated particulate glass into said chamber.

7. Apparatus for melting glass and forming fibers therefrom comprising a melting chamber having small apertures for forming fine, attenuable streams of glass and a plurality of upper wall openings for admitting glass marbles, means for heating said chamber including gaseous fuel burners which are directed into said chamber and exhausted through said plurality of openings, water-cooled chutes disposed over said upper wall openings and associated therewith gate means spaced from said upper wall openings for supporting a vertical column of particulate glass within said water-cooled chutes and for controlling the admission of preheated particulate glass into said chamber, said gate means comprising cooperating pins extending into said water-cooled chutes, which pins are moved relatively one to another so as to admit a single marble at a time from said column into said chamber.

References Cited in the file of this patent

UNITED STATES PATENTS

| Number | Name | Date |
| --- | --- | --- |
| 1,610,376 | Hitner | Dec. 14, 1926 |
| 1,610,377 | Hitner | Dec. 14, 1926 |
| 1,999,761 | Howard | Apr. 30, 1935 |
| 2,257,767 | Slayter et al. | Oct. 7, 1941 |
| 2,482,071 | Simison | Sept. 13, 1949 |

OTHER REFERENCES

"The Journal of Glass Manufacturing," September 1949, vol. 30, No. 9, pp. 492–496.